US009519232B2

(12) United States Patent
Kawahara et al.

(10) Patent No.: US 9,519,232 B2
(45) Date of Patent: Dec. 13, 2016

(54) ELECTROPHOTOGRAPHIC PHOTOSENSITIVE MEMBER, METHOD FOR PRODUCING ELECTROPHOTOGRAPHIC PHOTOSENSITIVE MEMBER, PROCESS CARTRIDGE AND ELECTROPHOTOGRAPHIC APPARATUS, AND HYDROXYGALLIUM PHTHALOCYANINE CRYSTAL

(71) Applicant: CANON KABUSHIKI KAISHA, Tokyo (JP)

(72) Inventors: Masataka Kawahara, Mishima (JP); Tsutomu Nishida, Mishima (JP); Junpei Kuno, Mishima (JP); Masato Tanaka, Tagata-gun (JP); Kaname Watariguchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/693,081

(22) Filed: Apr. 22, 2015

(65) Prior Publication Data

US 2015/0309427 A1 Oct. 29, 2015

(30) Foreign Application Priority Data

Apr. 24, 2014 (JP) ................................ 2014-090674

(51) Int. Cl.

*C09B 9/04* (2006.01)
*G03G 5/02* (2006.01)
*G03G 5/10* (2006.01)
*G03G 5/06* (2006.01)

(52) U.S. Cl.

CPC .......... *G03G 5/0662* (2013.01); *G03G 5/0696* (2013.01)

(58) Field of Classification Search

CPC ......... C09B 9/04; C09B 9/045; G03G 5/0211; G03G 5/10

See application file for complete search history.

(56) References Cited

U.S. PATENT DOCUMENTS 5,302,479 A * 4/1994 Daimon .............. C09B 67/0016 430/56

FOREIGN PATENT DOCUMENTS

JP H03-128973 A 5/1991
JP H05-249716 A 9/1993
JP 2010224459 * 10/2010 ............ G02F 1/135

OTHER PUBLICATIONS

Abstract of LV 13995, Aug. 20, 2009, Lavia, Gunars et al.*

* cited by examiner

*Primary Examiner* — Hoa V Le

(74) *Attorney, Agent, or Firm* — Canon U.S.A., Inc., IP Division

(57) ABSTRACT

An electrophotographic photosensitive member includes a support and a photosensitive layer on the support, and the photosensitive layer contains a hydroxygallium phthalocyanine crystal having peaks at Bragg angles 2θ±0.2° of 6.9°, 7.7°, 16.4°, 24.4°, and 26.5° in CuKα X-ray diffraction.

13 Claims, 4 Drawing Sheets

ELECTROPHOTOGRAPHIC PHOTOSENSITIVE MEMBER, METHOD FOR PRODUCING ELECTROPHOTOGRAPHIC PHOTOSENSITIVE MEMBER, PROCESS CARTRIDGE AND ELECTROPHOTOGRAPHIC APPARATUS, AND HYDROXYGALLIUM PHTHALOCYANINE CRYSTAL

BACKGROUND OF THE INVENTION

Field of the Invention

The present invention relates to an electrophotographic photosensitive member, a method for producing the electrophotographic photosensitive member, a process cartridge and an electrophotographic apparatus including the electrophotographic photosensitive member, and a hydroxygallium phthalocyanine crystal.

Description of the Related Art

At present, the oscillation wavelength of semiconductor lasers often used as image exposure devices in the field of electrophotography is a long wavelength of 650 to 820 nm. Therefore, electrophotographic photosensitive members that are highly sensitive to light having such a long wavelength are being developed. A phthalocyanine pigment is effective as a charge generation material having high sensitivity to light in such a long wavelength region. In particular, oxytitanium phthalocyanine and gallium phthalocyanine have excellent sensitivity characteristics, and various crystal forms have been reported.

Japanese Patent Laid-Open No. 5-249716 describes a hydroxygallium phthalocyanine crystal having peaks at Bragg angles (2θ±0.2°) of 7.9°, 16.5°, 24.4°, and 27.6° in CuKα X-ray diffraction. Japanese Patent Laid-Open No. 3-128973 describes an oxytitanium phthalocyanine crystal having peaks at Bragg angles (2θ±0.2°) of 9.0°, 14.2°, 23.9°, and 27.1° in CuKα X-ray diffraction.

However, sensitivity is not proportional to the electric field intensity, and thus sensitivity unevenness is easily caused due to the influence of thickness unevenness of a photosensitive layer.

SUMMARY OF THE INVENTION

As a result of studies conducted by the present inventors, it has been found that the hydroxygallium phthalocyanine crystal and the oxytitanium phthalocyanine crystal described in the above documents still have room for improvement in suppressing the sensitivity unevenness.

Aspects of the present invention provide an electrophotographic photosensitive member in which sensitivity unevenness caused by thickness unevenness is suppressed, and a method for producing the electrophotographic photosensitive member. Aspects of the present invention also provide a process cartridge and an electrophotographic apparatus including the electrophotographic photosensitive member. Aspects of the present invention also provide a hydroxygallium phthalocyanine crystal having a novel crystal form.

In an aspect of the present invention, an electrophotographic photosensitive member includes a support and a photosensitive layer on the support, wherein the photosensitive layer contains a hydroxygallium phthalocyanine crystal having peaks at Bragg angles 2θ±0.2° of 6.9°, 7.7°, 16.4°, 24.4°, and 26.5° in CuKα X-ray diffraction.

In an aspect of the present invention, a process cartridge is detachably attachable to a main body of an electrophotographic apparatus and integrally supports the electrophotographic photosensitive member and at least one selected from a charging device, a developing device, a transfer device, and a cleaning member.

In an aspect of the present invention, an electrophotographic apparatus includes the electrophotographic photosensitive member, a charging device, an exposure device, a developing device, and a transfer device.

In an aspect of the present invention, a hydroxygallium phthalocyanine crystal has peaks at Bragg angles 2θ±0.2° of 6.9°, 7.7°, 16.4°, 24.4°, and 26.5° in CuKα X-ray diffraction.

In an aspect of the present invention, a method for producing an electrophotographic photosensitive member including a support and a photosensitive layer on the support is provided, wherein the method includes the steps of: providing a hydroxygallium phthalocyanine crystal having peaks at Bragg angles 2θ±0.2° of 6.9°, 7.7°, 16.4°, 24.4°, and 26.5° in CuKα X-ray diffraction, by adding an amide compound and a hydroxygallium phthalocyanine and performing a milling treatment; and forming a photosensitive layer by forming a coating film of a photosensitive layer-forming coating solution containing the hydroxygallium phthalocyanine crystal and drying the coating film, wherein the amide compound is at least one selected from a compound represented by formula (1) below, a compound represented by formula (2) below, and a compound represented by formula (3) below.

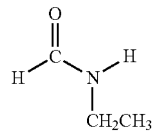

(1)

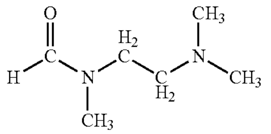

(2)

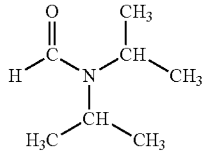

(3)

In an aspect of the present invention, a method for producing an electrophotographic photosensitive member including a support, a charge generating layer on the support, and a charge transporting layer on the charge generating layer is provided, wherein the method includes the steps of: providing a hydroxygallium phthalocyanine crystal having peaks at Bragg angles 2θ±0.2° of 6.9°, 7.7°, 16.4°, 24.4°, and 26.5° in CuKα X-ray diffraction by adding an amide compound and a hydroxygallium phthalocyanine and performing a milling treatment; and forming a charge generating layer by forming a coating film of a charge generating layer-forming coating solution containing the hydroxygallium phthalocyanine crystal and drying the coating film, wherein the amide compound is at least one selected from the compound represented by formula (1) above, the compound represented by formula (2) above, and the compound represented by formula (3) above.

According to embodiments of the present invention, there can be provided an electrophotographic photosensitive member in which sensitivity unevenness caused by thickness unevenness is suppressed, and a method for producing the electrophotographic photosensitive member. According to embodiments of the present invention, there can be provided a process cartridge and an electrophotographic apparatus including the electrophotographic photosensitive member. According to embodiments of the present invention, there can be provided a hydroxygallium phthalocyanine crystal having a novel crystal form.

Further features of the present invention will become apparent from the following description of exemplary embodiments with reference to the attached drawings.

DESCRIPTION OF THE EMBODIMENTS

Figure 1:
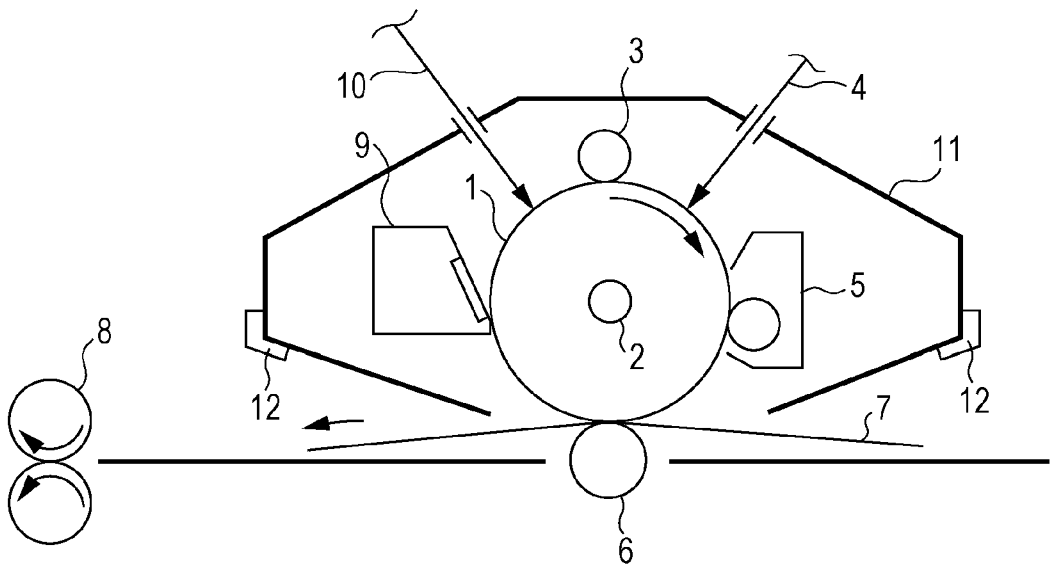
FIG. 1 illustrates an example of a schematic structure of an electrophotographic apparatus that includes a process cartridge including an electrophotographic photosensitive member.

An electrophotographic photosensitive member according to an embodiment of the present invention includes a support and a photosensitive layer formed on the support. The photosensitive layer contains a hydroxygallium phthalocyanine crystal having peaks at Bragg angles 2θ±0.2° of 6.9°, 7.7°, 16.4°, 24.4°, and 26.5° in CuKα X-ray diffraction. Hereafter, this is also referred to as a "hydroxygallium phthalocyanine crystal having a particular crystal form".

In the hydroxygallium phthalocyanine crystal having a particular crystal form, the photoelectric conversion quantum efficiency is linearly dependent on the electric field intensity. Therefore, the sensitivity unevenness caused by thickness unevenness is believed to be suppressed.

The hydroxygallium phthalocyanine crystal having a particular crystal form is obtained by performing the following treatment. That is, when a phthalocyanine obtained by an acid pasting method is subjected to crystal transformation by a milling treatment, compounds represented by formulae (1) to (3) below are added and a milling treatment is performed. In particular, hydroxygallium phthalocyanine obtained by subjecting chlorogallium phthalocyanine to acid pasting can be subjected to the above-mentioned milling treatment. The compound represented by any one of the formulae (1) to (3) below is also referred to as a "particular amide compound" hereafter.

(1)

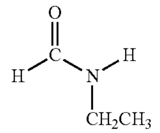

(2)

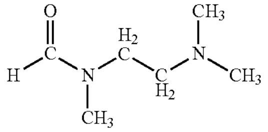

(3)

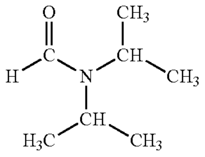

The milling treatment is a treatment performed with a milling machine such as a sand mill or a ball mill using dispersing media such as glass beads, steel beads, or alumina balls. The milling time is, for example, about 10 to 500 hours. A particularly desirable method is to perform sampling every 5 to 10 hours and check the Bragg angles of the hydroxygallium phthalocyanine crystal. The amount of the particular amide compound added in the milling treatment is, for example, 5 to 30 times the amount of phthalocyanine on a mass basis.

When the compound represented by the above formula (1) is used in the milling treatment, the hydroxygallium phthalocyanine crystal having a particular crystal form further has the following peaks. That is, the above-described hydroxygallium phthalocyanine crystal having a particular crystal form further has peaks at Bragg angles 2θ±0.2° of 12.0°, 19.0°, 23.0°, and 27.6° in CuKα X-ray diffraction.

When the compound represented by the above formula (2) is used in the milling treatment, the hydroxygallium phthalocyanine crystal having a particular crystal form further has the following peaks. That is, the above-described hydroxygallium phthalocyanine crystal having a particular crystal form further has peaks at Bragg angles 2θ±0.2° of 8.3°, 17.1°, and 25.3° in CuKα X-ray diffraction.

When the compound represented by the above formula (3) is used in the milling treatment, the hydroxygallium phthalocyanine crystal having a particular crystal form further has the following peaks. That is, the above-described hydroxygallium phthalocyanine crystal having a particular crystal form further has peaks at Bragg angles 2θ±0.2° of 13.2°, 17.1°, and 27.3° in CuKα X-ray diffraction.

The X-ray diffraction spectrum of the hydroxygallium phthalocyanine crystal was measured under the following conditions.

Powder X-Ray Diffraction Measurement
Measurement instrument used: X-ray diffractometer RINT-TTR II manufactured by Rigaku Corporation
X-ray tube: Cu
Tube voltage: 50 kV
Tube current: 300 mA
Scanning mode: 2θ/θ scan
Scanning speed: 4.0°/min
Sampling step size: 0.02°
Start angle (2θ): 5.0°
Stop angle (2θ): 40.0°
Attachment: standard sample holder Filter: nonuse
Incidence monochromator: use
Counter monochromator: nonuse
Divergence slit: open
Divergence vertical limitation slit: 10.00 mm
Scattering slit: open
Receiving slit: open
Flat monochromator: use
Counter: scintillation counter The hydroxygallium phthalocyanine crystal having a particular crystal form according to an embodiment of the present invention has an excellent function as a photoconductor, and thus can be applied to solar cells, sensors, switching elements, and the like in addition to electrophotographic photosensitive members.

Next, the case where the hydroxygallium phthalocyanine crystal having a particular crystal form according to an embodiment of the present invention is used as a charge generation material of the electrophotographic photosensitive member will be described. The photosensitive layer is classified into a single-layer type photosensitive layer containing both a charge generation material and a charge transport material and a multilayer type photosensitive layer separately including a charge generating layer containing a charge generation material and a charge transporting layer containing a charge transport material. Among them, a multilayer type photosensitive layer including a charge generating layer and a charge transporting layer formed on the charge generating layer is particularly employed. In this case, the charge generating layer contains the hydroxygallium phthalocyanine crystal having a particular crystal form according to an embodiment of the present invention.

Support

The support can be a support having electrical conductivity (electroconductive support). The support may be, for example, a support made of a metal or an alloy such as aluminum, an aluminum alloy, copper, zinc, stainless steel, vanadium, molybdenum, chromium, titanium, nickel, indium, gold, or platinum. The support may also be a resin support including a layer formed of aluminum, an aluminum alloy, indium oxide, tin oxide, or an indium oxide-tin oxide alloy by a vacuum deposition method. The support may also be a support obtained by coating a plastic, a metal, or an alloy with a mixture of conductive particles and a binder resin. The support may also be a support obtained by impregnating plastic or paper with conductive particles or may also be a conductive polymer-containing plastic. The surface of the support may be subjected to cutting, surface roughening, anodizing, electrochemical mechanical polishing, wet honing, dry honing, or the like to suppress interference fringes caused by scattering of laser beams.

A conductive layer may be disposed between the support and an undercoat layer described below in order to suppress interference fringes caused by scattering of laser beams and to cover scratches on the support. The conductive layer is formed by applying a conductive layer-forming coating liquid prepared by dispersing conductive particles such as carbon black, metal particles, and metal oxide particles, a binder resin, and a solvent and then drying the resulting coating film.

Examples of the conductive particles include aluminum particles, titanium oxide particles, tin oxide particles, zinc oxide particles, carbon black, and silver particles. Examples of the binder resin include polyester, polycarbonate, polyvinyl butyral, acrylic resin, silicone resin, epoxy resin, melamine resin, urethane resin, phenolic resin, and alkyd resin. Examples of the solvent for the conductive layer-forming coating liquid include ether solvents, alcohol solvents, ketone solvents, and aromatic hydrocarbon solvents.

An undercoat layer (also referred to as a barrier layer or an intermediate layer) having a barrier function and an adhesive function may also be disposed between the support and the photosensitive layer. The undercoat layer can be formed by forming a coating film of an undercoat layer-forming coating solution prepared by mixing a binder resin and a solvent and drying the coating film.

Examples of the binder resin include polyvinyl alcohol, polyethylene oxide, ethyl cellulose, methyl cellulose, casein, polyamide (e.g., nylon 6, nylon 66, nylon 610, copolymer nylon, and N-alkoxymethylated nylon), and polyurethane. The thickness of the undercoat layer is preferably 0.1 to 10 μm and more preferably 0.5 to 5 μm. Examples of the solvent for the undercoat layer-forming coating solution include ether solvents, alcohol solvents, ketone solvents, and aromatic hydrocarbon solvents.

Photosensitive Layer

When the single-layer type photosensitive layer is formed, a hydroxygallium phthalocyanine crystal having a particular crystal form, which serves as a charge generation material, a charge transport material, and a binder resin are mixed in a solvent to prepare a photosensitive layer-forming coating solution. A coating film of the photosensitive layer-forming coating solution is formed, and the resulting coating film is dried to form a single-layer type photosensitive layer.

When the multilayer type photosensitive layer is formed, the charge generating layer can be formed as follows. A hydroxygallium phthalocyanine crystal having a particular crystal form, which serves as a charge generation material, and a binder resin are mixed in a solvent to prepare a charge generating layer-forming coating solution. A coating film of the charge generating layer-forming coating solution is formed, and the resulting coating film is dried to form a charge generating layer. Alternatively, the charge generating layer can also be formed by vapor deposition.

Examples of the binder resin used for the single-layer type photosensitive layer or the charge generating layer include polycarbonate, polyester, butyral resin, polyvinyl acetal, acrylic resin, vinyl acetate resin, and urea resin. Among them, butyral resin is particularly used. These binder resins may be used alone or in combination of two or more as a mixture or a copolymer.

Examples of the solvent used for the single-layer type photosensitive layer-forming coating solution or the charge generating layer-forming coating solution include alcohol solvents, sulfoxide solvents, ketone solvents, ether solvents, ester solvents, and aromatic hydrocarbon solvents. These solvents may be used alone or in combination of two or more.

When the photosensitive layer is a single-layer type photosensitive layer, the content of the charge generation material is, for example, 3 to 30 mass % relative to the total mass of the photosensitive layer. The content of the charge transport material is, for example, 30 to 70 mass % relative to the total mass of the photosensitive layer. The thickness of the single-layer type photosensitive layer is preferably 4 to 40 μm and more preferably 5 to 25 μm.

When the photosensitive layer is a multilayer type photosensitive layer, the content of the charge generation material is preferably 20 to 90 mass % and more preferably 50 to 80 mass % relative to the total mass of the charge generating layer. The thickness of the charge generating layer is preferably 0.01 to 10 μm and more preferably 0.1 to 3 μm.

Examples of a coating method of the photosensitive layer include dipping, spray coating, spinner coating, bead coating, blade coating, and beam coating.

In the present invention, the hydroxygallium phthalocyanine crystal containing a particular amide compound therein is used as the charge generation material, but the hydroxygallium phthalocyanine crystal may be used as a mixture with other charge generation materials. In this case, the content of the phthalocyanine crystal containing a particular amide compound therein is, for example, 50 mass % or more relative to the entire charge generation material.

Charge Transporting Layer

The charge transporting layer can be formed by applying a charge transporting layer-forming coating solution prepared by dissolving a charge transport material and a binder resin in a solvent to form a coating film and drying the resulting coating film.

Examples of the charge transport material include triarylamine compounds, hydrazone compounds, stilbene compounds, pyrazoline compounds, oxazole compounds, thiazole compounds, and triallylmethane compounds.

Examples of the binder resin used for the charge transporting layer include polyester, acrylic resin, polyvinyl carbazole, phenoxy resin, polycarbonate, polyvinyl butyral, polystyrene, polyvinyl acetate, polysulfone, polyarylate, vinylidene chloride, acrylonitrile copolymers, and polyvinyl benzal.

The content of the charge transport material is preferably 20 to 80 mass % and more preferably 30 to 70 mass % relative to the total mass of the charge transporting layer. The thickness of the charge transporting layer is preferably 4 to 40 μm and more preferably 5 to 25 μm.

A protective layer may be optionally disposed on the photosensitive layer. The protective layer can be formed by forming a coating film of a protective layer-forming coating solution prepared by dissolving a binder resin in a solvent and drying the resulting coating film. Examples of the binder resin include polyvinyl butyral, polyester, polycarbonate (e.g., polycarbonate Z and modified polycarbonate), nylon, polyimide, polyarylate, polyurethane, styrene-butadiene copolymers, styrene-acrylic acid copolymers, and styrene-acrylonitrile copolymers.

To provide charge transportability to the protective layer, the protective layer may be formed by curing a monomer having charge transportability (hole transportability) through a polymerization reaction or a cross-linking reaction. Specifically, the protective layer can be formed by curing a charge transporting compound (hole transporting compound) having a chain-polymerizable functional group through polymerization or cross-linking.

The thickness of the protective layer is, for example, 0.05 to 20 μm. The protective layer may contain conductive particles, an ultraviolet absorber, and the like. Examples of the conductive particles include metal oxide particles such as tin oxide particles.

FIG. 1 illustrates an example of a schematic structure of an electrophotographic apparatus that includes a process cartridge including the electrophotographic photosensitive member according to an embodiment of the present invention.

A cylindrical (drum-shaped) electrophotographic photosensitive member 1 is rotated about a shaft 2 at a predetermined peripheral speed (process speed) in a direction indicated by an arrow. In the rotation, the surface of the electrophotographic photosensitive member 1 is charged at a predetermined positive or negative potential by a charging device 3. The surface of the charged electrophotographic photosensitive member 1 is then irradiated with exposure light 4 emitted from an exposure device (not illustrated). Thus, an electrostatic latent image corresponding to intended image information is formed on the surface of the electrophotographic photosensitive member 1. The exposure light 4 is, for example, intensity-modulated light emitted from an exposure device such as a slit exposure device or a laser beam scanning exposure device, in response to the time-series electric digital image signals of the intended image information.

The electrostatic latent image formed on the surface of the electrophotographic photosensitive member 1 is subjected to development (normal or reversal development) with a developing agent (toner) contained in a developing device 5, and thus a toner image is formed on the surface of the electrophotographic photosensitive member 1. The toner image formed on the surface of the electrophotographic photosensitive member 1 is transferred onto a transfer material 7 by a transfer device 6. Herein, a bias voltage having polarity opposite to the polarity of the electric charge of the toner is applied to the transfer device 6 from a bias power supply (not illustrated). The transfer material 7 is fed to a portion between the electrophotographic photosensitive member 1 and the transfer device 6 from a transfer material feeding device (not illustrated) in synchronism with the rotation of the electrophotographic photosensitive member 1.

The transfer material 7 onto which the toner image has been transferred is separated from the surface of the electrophotographic photosensitive member 1 and is conveyed to a fixing device 8. After the toner image is fixed, the transfer material 7 is output from the electrophotographic apparatus as an image-formed article (such as a print or a copy).

The surface of the electrophotographic photosensitive member 1 after the toner image has been transferred onto the transfer material 7 is cleaned by removing deposits such as toner (residual toner) with a cleaning member 9. In recent years, a cleanerless system has been developed, and the residual toner can be directly removed with a developing device or the like. Furthermore, the electricity on the surface of the electrophotographic photosensitive member 1 is removed with pre-exposure light 10 from a pre-exposure device (not illustrated), and then the electrophotographic photosensitive member 1 is repeatedly used for image forming. In the case where the charging device 3 is a contact charging device that uses a charging roller or the like, the pre-exposure device is not necessarily required.

In the present invention, a plurality of components selected from the components such as the above-described electrophotographic photosensitive member 1, charging device 3, developing device 5, and cleaning member 9 may be incorporated in a container and integrally supported to provide a process cartridge. The process cartridge may be detachably attachable to the main body of an electrophotographic apparatus. For example, the electrophotographic photosensitive member 1 and at least one selected from the charging device 3, the developing device 5, and the cleaning member 9 are integrally supported to provide a process cartridge 11, which is detachably attachable to the main body of an electrophotographic apparatus using a guide unit 12 such as a rail of the main body.

In the case where the electrophotographic apparatus is a copying machine or a printer, the exposure light 4 may be reflected light from a document or transmitted light. Alternatively, the exposure light 4 may be light applied by, for example, scanning with a laser beam according to signals into which a document read by a sensor is converted, driving of an LED array, or driving of a liquid-crystal shutter array.

EXAMPLES

Hereafter, the present invention will be further described in detail based on specific examples, but is not limited thereto. The thickness of each layer of electrophotographic photosensitive members in Examples and Comparative Examples was determined by using an eddy current thickness meter (Fischerscope, manufactured by Fischer Instruments) or by conversion from the mass per unit area using specific gravity. Note that "part" in Examples and Comparative Examples means "part by mass".

Example 1-1

A hydroxygallium phthalocyanine was produced as follows in the same manner as in Synthesis Example 1 and Example 1-1 described in Japanese Patent Laid-Open No. 2011-94101. In an atmosphere of nitrogen flow, 5.46 parts of phthalonitrile and 45 parts of α-chloronaphthalene were charged into a reaction vessel and heated to a temperature of 30° C., and then the temperature was maintained. Subsequently, 3.75 parts of gallium trichloride was charged at 30° C. The moisture content of the mixture solution at the moment of the charging was 150 ppm. The temperature was then increased to 200° C. Subsequently, the reaction was caused to proceed in an atmosphere of nitrogen flow at 200° C. for 4.5 hours, and then the temperature was decreased. When the temperature reached 150° C., the reaction product was filtered. The filter residue was washed by performing dispersion using N,N-dimethylformamide at 140° C. for two hours and then filtered. The resulting filter residue was washed with methanol and then dried to obtain 4.65 parts of a chlorogallium phthalocyanine pigment (yield 71%). Subsequently, 4.65 parts of the obtained chlorogallium phthalocyanine pigment was dissolved in 139.5 parts of concentrated sulfuric acid at 10° C. The mixture was dropped into 620 parts of ice water under stirring to perform reprecipitation, and filtration was performed with a filter press. The resulting wet cake (filter residue) was washed by performing dispersion with 2% ammonia water and then filtered with a filter press. Subsequently, the resulting wet cake (filter residue) was washed by performing dispersion with ion-exchanged water and then repeatedly filtered with a filter press three times. Thus, a hydroxygallium phthalocyanine (hydrated hydroxygallium phthalocyanine) having a solid content of 23% was obtained. Then, 6.6 kg of the obtained hydroxygallium phthalocyanine (hydrated hydroxygallium phthalocyanine) was irradiated with microwaves using a Hyper-Drier (trade name: HD-06R, frequency (oscillation frequency): 2455 MHz±15 MHz, manufactured by Biocon (Japan) Ltd.) to dry the hydroxygallium phthalocyanine.

Figure 2:
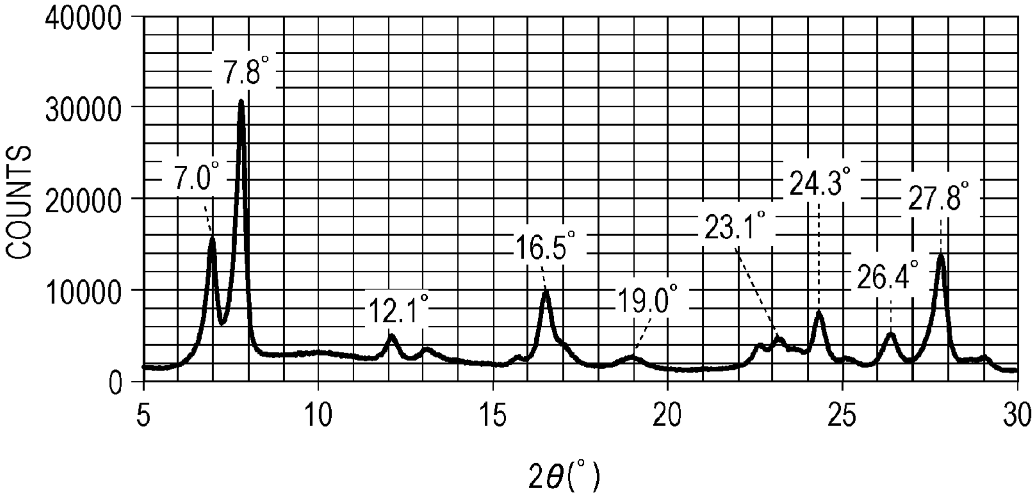
FIG. 2 shows a powder X-ray diffraction pattern of a hydroxygallium phthalocyanine crystal obtained in Example 1-1.

At room temperature (23° C.), 0.5 parts of the hydroxygallium phthalocyanine and 9.5 parts of the compound represented by the above formula (1) (product code: F0188, manufactured by Tokyo Chemical Industry Co., Ltd.) were subjected to a milling treatment together with 15 parts of glass beads having a diameter of 0.8 mm using a paint shaker (manufactured by Toyo Seiki Seisaku-Sho, Ltd.) for 8 hours. A hydroxygallium phthalocyanine crystal was extracted from the dispersion liquid using tetrahydrofuran and filtered. The resulting filter residue on the filter was thoroughly washed with tetrahydrofuran. The filter residue was vacuum-dried to produce 0.45 parts of a hydroxygallium phthalocyanine crystal. FIG. 2 shows a powder X-ray diffraction pattern of the produced crystal.

The hydroxygallium phthalocyanine crystal produced in Example 1-1 had peaks at Bragg angles 2θ±0.2° of 6.9°, 7.7°, 16.4°, 24.3°, and 26.5° in CuKα X-ray diffraction. Furthermore, the hydroxygallium phthalocyanine crystal produced in Example 1-1 also had peaks at Bragg angles 2θ±0.2° of 12.0°, 19.0°, 23.0°, and 27.6°.

Example 1-2

Figure 3:
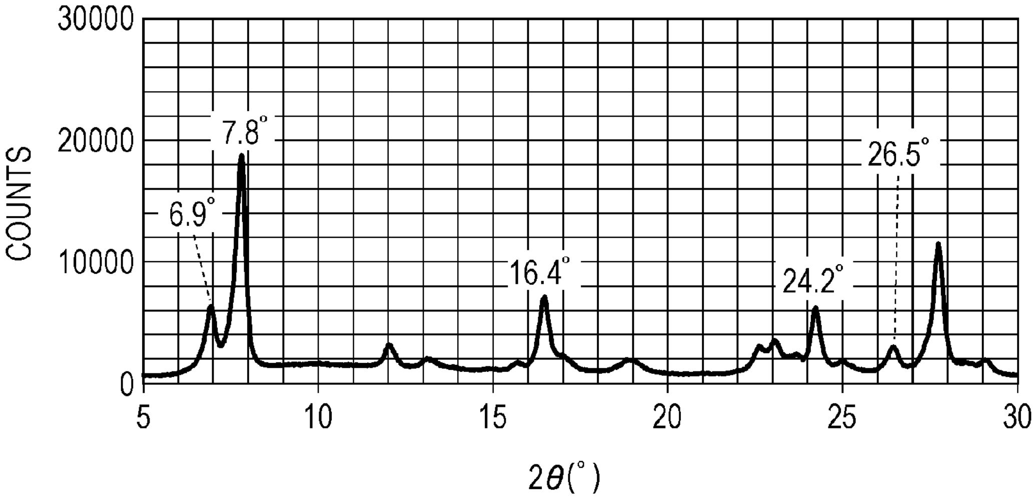
FIG. 3 shows a powder X-ray diffraction pattern of a hydroxygallium phthalocyanine crystal obtained in Example 1-2.

A hydroxygallium phthalocyanine crystal was produced in the same manner as in Example 1-1, except that the milling treatment was performed for 30 hours using a ball mill instead of the paint shaker. FIG. 3 shows a powder X-ray diffraction pattern of the produced crystal.

The hydroxygallium phthalocyanine crystal produced in Example 1-2 had peaks at Bragg angles 2θ±0.2° of 6.9°, 7.7°, 16.4°, 24.3°, and 26.5° in CuKα X-ray diffraction. Furthermore, the hydroxygallium phthalocyanine crystal produced in Example 1-2 also had peaks at Bragg angles 2θ±0.2° of 12.0°, 19.0°, 23.0°, and 27.6°.

Example 1-3

Figure 4:
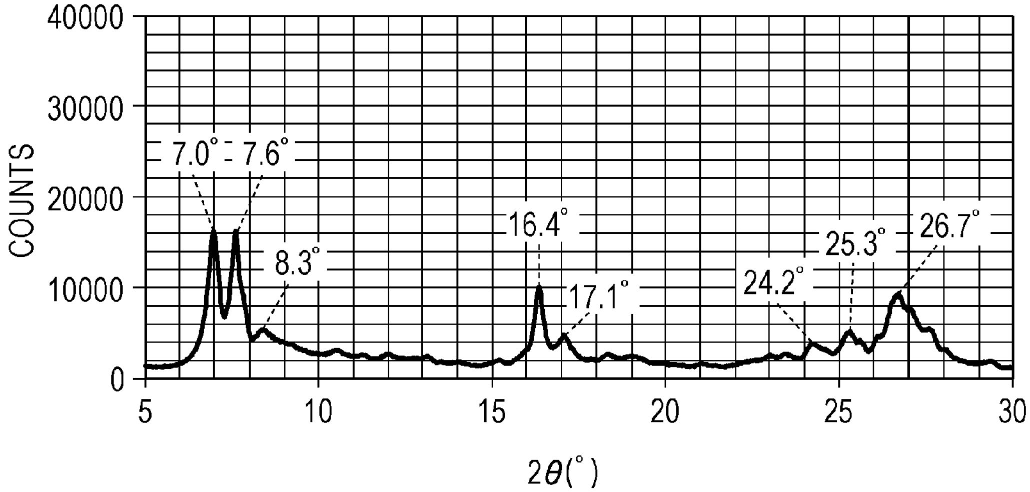
FIG. 4 shows a powder X-ray diffraction pattern of a hydroxygallium phthalocyanine crystal obtained in Example 1-3.

A hydroxygallium phthalocyanine crystal was produced in the same manner as in Example 1-2, except that the compound represented by the above formula (2) (product code: D3724, manufactured by Tokyo Chemical Industry Co., Ltd.) was used instead of the compound represented by the formula (1). FIG. 4 shows a powder X-ray diffraction pattern of the produced crystal. The hydroxygallium phthalocyanine crystal produced in Example 1-3 had peaks at Bragg angles 2θ±0.2° of 6.9°, 7.7°, 16.4°, 24.3°, and 26.5° in CuKα X-ray diffraction. Furthermore, the hydroxygallium phthalocyanine crystal produced in Example 1-3 also had peaks at Bragg angles 2θ±0.2° of 8.3°, 17.1°, and 25.3°.

Example 1-4

Figure 5:
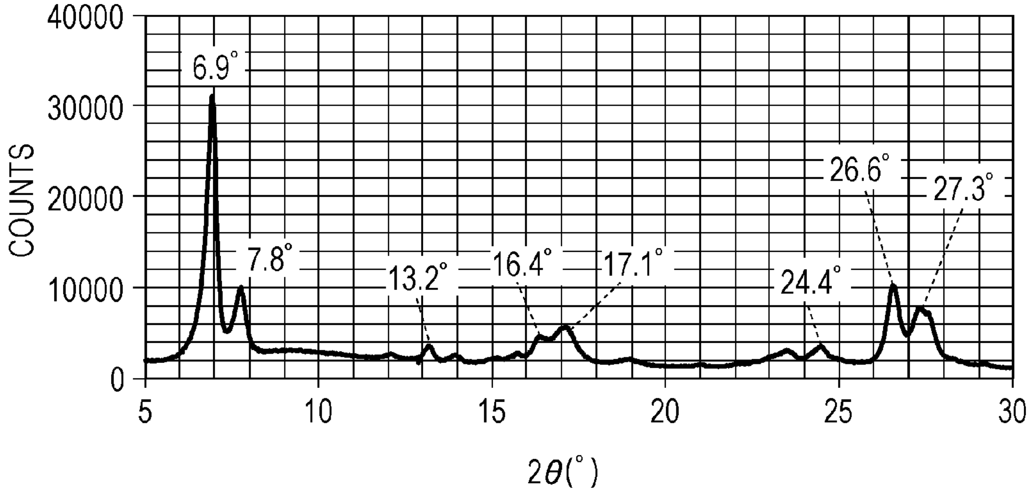
FIG. 5 shows a powder X-ray diffraction pattern of a hydroxygallium phthalocyanine crystal obtained in Example 1-4.

A hydroxygallium phthalocyanine crystal was produced in the same manner as in Example 1-2, except that the compound represented by the above formula (3) (product code: D1651, manufactured by Tokyo Chemical Industry Co., Ltd.) was used instead of the compound represented by the formula (1). FIG. 5 shows a powder X-ray diffraction pattern of the produced crystal. The hydroxygallium phthalocyanine crystal produced in Example 1-4 had peaks at Bragg angles 2θ±0.2° of 6.9°, 7.7°, 16.4°, 24.3°, and 26.5° in CuKα X-ray diffraction. Furthermore, the hydroxygallium phthalocyanine crystal produced in Example 1-4 also had peaks at Bragg angles 2θ±0.2° of 13.2°, 17.1°, and 27.3°.

Comparative Example 1-1

A hydroxygallium phthalocyanine crystal was produced by performing the milling treatment in Example 1-1 in the same manner as in Synthesis Example 3 of Japanese Patent Laid-Open No. 5-249716. That is, 0.5 parts of the hydroxygallium phthalocyanine crystal after the microwave drying step in Example 1-1 and 15 parts of dimethylsulfoxide (product code: D0601, manufactured by Tokyo Chemical Industry Co., Ltd.) were subjected to a milling treatment together with 30 parts of glass beads having a diameter of 5 mm using a ball mill at room temperature (23° C.) for 24 hours. A hydroxygallium phthalocyanine crystal was extracted from the dispersion liquid using tetrahydrofuran and filtered. The resulting filter residue on the filter was thoroughly washed with tetrahydrofuran. The filter residue was vacuum-dried to obtain 0.45 parts of a hydroxygallium phthalocyanine crystal. The X-ray diffraction pattern of the hydroxygallium phthalocyanine crystal obtained in Comparative Example 1-1 was a pattern shown in FIG. 4 of Japanese Patent Laid-Open No. 5-249716 and thus did not have a peak at a Bragg angle 2θ±0.2° of 6.9°.

Comparative Example 1-2

Figure 6:
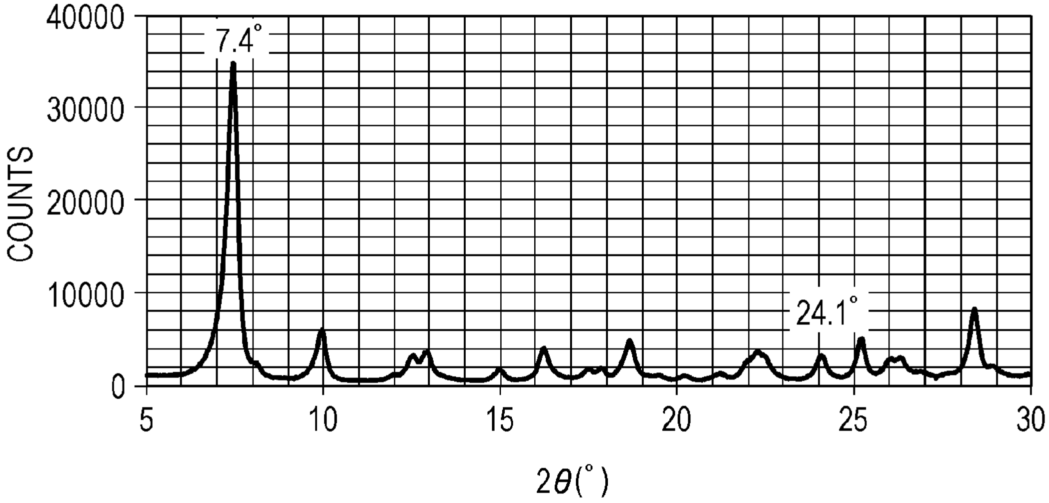
FIG. 6 shows a powder X-ray diffraction pattern of a hydroxygallium phthalocyanine crystal obtained in Comparative Example 1-2.

A hydroxygallium phthalocyanine crystal was produced in the same manner as in Example 1-2, except that the compound represented by the formula (1) was changed to tetrahydrofuran (product code: T2394, manufactured by Tokyo Chemical Industry Co., Ltd.). FIG. 6 shows a powder X-ray diffraction pattern of the produced crystal. The hydroxygallium phthalocyanine crystal produced in Comparative Example 1-2 did not have peaks at Bragg angles 2θ±0.2° of 6.9°, 7.7°, or, 24.4° in the X-ray diffraction pattern.

Comparative Example 1-3

An oxytitanium phthalocyanine crystal was produced as follows in the same manner as in Production Example 1 of Japanese Patent Laid-Open No. 3-128973. In 100 g of α-chloronaphthalene, 5.0 g of o-phthalodinitrile and 2.0 g of titanium tetrachloride were heated and stirred at 200° C. for 3 hours, and the temperature was decreased to 50° C. The precipitated crystal was filtered to obtain a paste of dichlorotitanium phthalocyanine. The paste was then washed with 100 ml of N,N-dimethylformamide heated to 100° C. under stirring, washed with 100 ml of methanol at 60° C. twice, and filtered. Furthermore, the resulting paste was stirred in 100 ml of deionized water at 80° C. for 1 hour and filtered to obtain a blue oxytitanium phthalocyanine crystal. Subsequently, the crystal was dissolved in 150 g of concentrated sulfuric acid. The mixture was dropped into 1500 ml of deionized water at 20° C. under stirring to perform reprecipitation. The crystal was filtered and thoroughly washed with water to obtain an amorphous oxytitanium phthalocyanine. Then, 4.0 g of the obtained amorphous oxytitanium phthalocyanine was suspended and stirred in 100 ml of methanol at room temperature (22° C.) for 8 hours, filtered, and dried under reduced pressure to obtain a low crystallinity oxytitanium phthalocyanine. Subsequently, 40 ml of n-butyl ether was added to 2.0 g of the oxytitanium phthalocyanine, and a milling treatment was performed together with 1 mmϕ glass beads at room temperature (23° C.) for 20 hours. A solid was extracted from the dispersion liquid, thoroughly washed with methanol and then water, and dried to produce an oxytitanium phthalocyanine. The X-ray diffraction pattern of the oxytitanium phthalocyanine crystal was a pattern shown in FIG. 1 of Japanese Patent Laid-Open No. 3-128973 and thus did not have peaks at Bragg angles 2θ±0.2° of 6.9°, 7.7°, 16.4°, 24.4°, and 26.5°.

Example 2-1

A solution containing 60 parts of barium sulfate particles coated with tin oxide (trade name: Passtran PC1, manufactured by MITSUI MINING & SMELTING Co., Ltd.), 15 parts of titanium oxide particles (trade name: TITANIX JR, manufactured by TAYCA CORPORATION), 43 parts of resole phenolic resin (trade name: Phenolite J-325, manufactured by DIC Corporation, solid content: 70 mass %), 0.015 parts of silicone oil (trade name: SH28PA, manufactured by Dow Corning Toray Co., Ltd.), 3.6 parts of silicone resin (trade name: Tospearl 120, manufactured by Toshiba Silicone Co., Ltd.), 50 parts of 2-methoxy-1-propanol, and 50 parts of methanol was dispersed using a ball mill for 20 hours to prepare a conductive layer-forming coating liquid.

The conductive layer-forming coating liquid was applied onto an aluminum cylinder (diameter: 24 mm) serving as a support by dipping to form a coating film. The coating film was dried at 140° C. for 30 minutes to form a conductive layer having a thickness of 15 μm.

Subsequently, 10 parts of copolymer nylon resin (trade name: Amilan CM8000, manufactured by Toray Industries, Inc.) and 30 parts of methoxymethylated 6 nylon resin (trade name: Toresin EF-30T, manufactured by Teikoku Chemical Industries Co., Ltd.) were dissolved in a mixed solvent of methanol 400 parts/n-butanol 200 parts to prepare an undercoat layer-forming coating solution.

The undercoat layer-forming coating solution was applied onto the conductive layer by dipping to form a coating film. The coating film was dried to form an undercoat layer having a thickness of 0.5 μm.

Subsequently, 10 parts of the hydroxygallium phthalocyanine crystal (charge generation material) obtained in Example 1-1, 5 parts of polyvinyl butyral (trade name: S-LEC BX-1, manufactured by SEKISUI CHEMICAL CO., LTD.), and 250 parts of cyclohexanone were inserted into a sand mill that uses glass beads having a diameter of 1 mm and dispersed for 1 hour. After the dispersion, the dispersion liquid was diluted by adding 250 parts of ethyl acetate to the dispersion liquid to prepare a charge generating layer-forming coating solution.

The charge generating layer-forming coating solution was applied onto the undercoat layer by dipping to form a coating film. The coating film was dried at 100° C. for 10 minutes to form a charge generating layer having a thickness of 0.16 μm at positions 30 mm and 100 mm from the upper end of the support.

Subsequently, 8 parts of a compound represented by formula (4) below (charge transport material) and 10 parts of polycarbonate (trade name: Iupilon Z-200, manufactured by MITSUBISHI GAS CHEMICAL COMPANY, INC.) were dissolved in 80 parts of monochlorobenzene to prepare a charge transporting layer-forming coating solution.

(4)

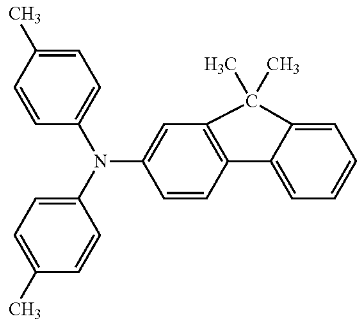

The charge transporting layer-forming coating solution was applied onto the charge generating layer by dipping to form a coating film. The coating film was dried at 110° C. for 1 hour to form a charge transporting layer having unevenness in film thickness, that is, a charge transporting layer having a thickness of 8 μm at a position 30 mm from the upper end of the support and a thickness of 13.5 μm at a position 100 mm from the upper end of the support.

Thus, a cylindrical (drum-shaped) electrophotographic photosensitive member of Example 2-1 was produced.

Examples 2-2 to 2-4

Electrophotographic photosensitive members of Examples 2-2 to 2-4 were produced in the same manner as in Example 2-1, except that the hydroxygallium phthalocyanine crystal used when the charge generating layer-forming coating solution was prepared in Example 2-1 was changed to the hydroxygallium phthalocyanine crystals obtained in Examples 1-2 to 1-4.

Comparative Examples 2-1 to 2-3

Electrophotographic photosensitive members of Comparative Examples 2-1 to 2-3 were produced in the same manner as in Example 2-1, except that the hydroxygallium phthalocyanine crystal used when the charge generating layer-forming coating solution was prepared in Example 2-1 was changed to the hydroxygallium phthalocyanine crystals obtained in Comparative Examples 1-1 to 1-3.

Evaluation of Examples 2-1 to 2-4

The sensitivity of the electrophotographic photosensitive members of Examples 2-1 to 2-4 were evaluated.

A laser beam printer (trade name: Laser Jet P2015dn) manufactured by Hewlett-Packard Japan, Ltd. was used as an electrophotographic apparatus for evaluation. The laser beam printer was converted such that the charging conditions and the image exposure can be changed.

In a normal-temperature-and-normal-humidity environment of 23° C./55% RH, the charging conditions and the image exposure were adjusted such that the dark-area potential was −450 V and the light-area potential was −170 V in terms of an average potential in the peripheral direction of the electrophotographic photosensitive member at a position 100 mm from the upper end of the support of the electrophotographic photosensitive member. The surface potential of the cylindrical electrophotographic photosensitive member in the potential setting was measured as follows. A cartridge was converted to install a potential probe (trade name: model 6000B-8, manufactured by TREK JAPAN) at the development position. Then, the potential at the center of the cylindrical electrophotographic photosensitive member was measured with a surface electrometer (trade name: model 344, manufactured by TREK JAPAN).

Then, the light-area potential at a position 30 mm from the upper end of the support of the electrophotographic photosensitive member was measured under the same conditions. The difference between the measured light-area potential and the light-area potential (−170 V) at the position 100 mm from the upper end of the support was determined, and thus the sensitivity unevenness caused by thickness unevenness of the charge transporting layer was evaluated. Table 1 shows the evaluation results. The electrophotographic photosensitive members of Examples have a potential difference smaller than that of the electrophotographic photosensitive members of Comparative Examples, which suggests that the electrophotographic photosensitive members of Examples have small sensitivity unevenness.

Evaluation of Comparative Examples 2-1 to 2-3

The sensitivity of the electrophotographic photosensitive members of Comparative Examples 2-1 to 2-3 was evaluated in the same manner as in Example 2-1. Table 1 shows the evaluation results. The results show that the electrophotographic photosensitive members of Comparative Examples 2-1 to 2-3 have sensitivity unevenness larger than that of the electrophotographic photosensitive members of Examples.

TABLE 1

| | Potential difference |
|---|---|
| Example 2-1 | 1 V |
| Example 2-2 | 2 V |
| Example 2-3 | 3 V |
| Example 2-4 | 2 V |
| Comparative Example 2-1 | 75 V |
| Comparative Example 2-2 | 60 V |
| Comparative Example 2-3 | 80 V |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-090674, filed Apr. 24, 2014, which is hereby incorporated by reference herein in its entirety.

What is claimed is:

1. A hydroxygallium phthalocyanine crystal comprising peaks at Bragg angles 2θ±0.2° of 6.9°, 7.7°, 16.4°, 24.4°, and 26.5° in CuKα X-ray diffraction.

2. The hydroxygallium phthalocyanine crystal according to claim 1, further comprising peaks at Bragg angles 2θ±0.2° of 12.0°, 19.0°, 23.0°, and 27.6° in CuKα X-ray diffraction.

3. The hydroxygallium phthalocyanine crystal according to claim 1, further comprising peaks at Bragg angles 2θ±0.2° of 8.3°, 17.1°, and 25.3° in CuKα X-ray diffraction.

4. The hydroxygallium phthalocyanine crystal according to claim 1, further comprising peaks at Bragg angles 2θ±0.2° of 13.2°, 17.1°, and 27.3° in CuKα X-ray diffraction.

5. An electrophotographic photosensitive member comprising:

a support; and a photosensitive layer on the support;

wherein the photosensitive layer comprises a hydroxygallium phthalocyanine crystal having peaks at Bragg angles 2θ±0.2° of 6.9°, 7.7°, 16.4°, 24.4°, and 26.5° in CuKα X-ray diffraction.

6. The electrophotographic photosensitive member according to claim 5, wherein the hydroxygallium phthalocyanine crystal further has peaks at Bragg angles 2θ±0.2° of 12.0°, 19.0°, 23.0°, and 27.6° in CuKα X-ray diffraction.

7. The electrophotographic photosensitive member according to claim 5, wherein the hydroxygallium phthalocyanine crystal further has peaks at Bragg angles 2θ±0.2° of 8.3°, 17.1°, and 25.3° in CuKα X-ray diffraction.

8. The electrophotographic photosensitive member according to claim 5, wherein the hydroxygallium phthalocyanine crystal further has peaks at Bragg angles 2θ±0.2° of 13.2°, 17.1°, and 27.3° in CuKα X-ray diffraction.

9. The electrophotographic photosensitive member according to claim 5, wherein the photosensitive layer comprises a charge generating layer and a charge transporting layer on the charge generating layer, and the charge generating layer comprises the hydroxygallium phthalocyanine crystal.

10. A process cartridge detachably attachable to a main body of an electrophotographic apparatus, wherein the process cartridge integrally supports the electrophotographic photosensitive member according to claim 5, and at least one selected from the group consisting of a charging device, a developing device, a transfer device, and a cleaning member.

11. An electrophotographic apparatus comprising:

the electrophotographic photosensitive member according to claim 5;

a charging device;

an exposure device;

a developing device; and a transfer device.

12. A method for producing an electrophotographic photosensitive member comprising a support and a photosensitive layer on the support, wherein the method comprises the steps of:

providing a hydroxygallium phthalocyanine crystal having peaks at Bragg angles $2\theta \pm 0.2°$ of 6.9°, 7.7°, 16.4°, 24.4°, and 26.5° in CuKα X-ray diffraction by adding an amide compound and a hydroxygallium phthalocyanine and performing a milling treatment; and forming a photosensitive layer by forming a coating film of a photosensitive layer-forming coating solution containing the hydroxygallium phthalocyanine crystal and drying the coating film, wherein the amide compound is at least one selected from the group consisting of a compound represented by formula (1) below, a compound represented by formula (2) below, and a compound represented by formula (3) below.

(1)

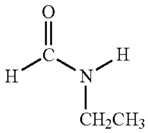

(2)

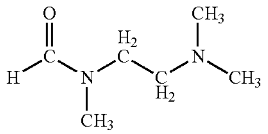

-continued (3)

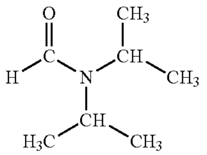

13. A method for producing an electrophotographic photosensitive member comprising a support, a charge generating layer on the support, and a charge transporting layer on the charge generating layer, wherein the method comprises the steps of:

providing a hydroxygallium phthalocyanine crystal having peaks at Bragg angles $2\theta \pm 0.2°$ of 6.9°, 7.7°, 16.4°, 24.4°, and 26.5° in CuKα X-ray diffraction, by adding an amide compound and a hydroxygallium phthalocyanine and performing a milling treatment; and forming a charge generating layer by forming a coating film of a charge generating layer-forming coating solution containing the hydroxygallium phthalocyanine crystal and drying the coating film, wherein the amide compound is at least one selected from the group consisting of a compound represented by formula (1) below, a compound represented by formula (2) below, and a compound represented by formula (3) below.

(1)

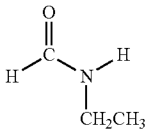

(2)

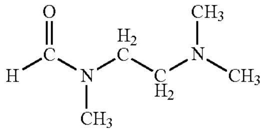

(3)

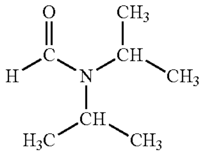

* * * * *